United States Patent
Liu et al.

(10) Patent No.: US 11,457,354 B2
(45) Date of Patent: Sep. 27, 2022

(54) SYSTEM AND METHOD TO SECURELY BROADCAST A MESSAGE TO ACCELERATORS

(71) Applicant: Baidu USA LLC, Sunnyvale, CA (US)

(72) Inventors: Yong Liu, Sunnyvale, CA (US);
Yueqiang Cheng, Sunnyvale, CA (US)

(73) Assignees: BAIDU USA LLC, Sunnyvale, CA (US); KUNLUNXIN TECHNOLOGY (BEIJING) COMPANY LIMITED, Beijing (CN)

( * ) Notice: Subject to any disclaimer, the term of this patent is extended or adjusted under 35 U.S.C. 154(b) by 157 days.

(21) Appl. No.: 16/709,389

(22) Filed: Dec. 10, 2019

(65) Prior Publication Data
US 2021/0176632 A1 Jun. 10, 2021

(51) Int. Cl.
*H04W 12/04* (2021.01)
*H04W 12/0471* (2021.01)
(Continued)

(52) U.S. Cl.
CPC ........ *H04W 12/0471* (2021.01); *G06N 20/00* (2019.01); *H04W 4/06* (2013.01);
(Continued)

(58) Field of Classification Search
CPC ........... H04W 12/0471; H04W 12/033; H04W 12/041; H04W 4/06; H04W 4/12; H04W 64/00; G06N 20/00; H04L 2463/062; H04L 63/0428; H04L 63/12; H04L 63/0823; G06F 21/57; G06F 21/64
See application file for complete search history.

(56) References Cited

U.S. PATENT DOCUMENTS 6,426,945 B1 *  7/2002 Sengodan ............... H04L 12/64
                                                      370/238
6,553,009 B2     4/2003 Artzi et al.
                      (Continued)

OTHER PUBLICATIONS

PacketShader: A GPU-Accelerated Software Router, Sangjin Han et al. published in 2010 (Year: 2010).*
(Continued)

*Primary Examiner* — Jeremy S Duffield
*Assistant Examiner* — Andrew Suh
(74) *Attorney, Agent, or Firm* — Womble Bond Dickinson (US) LLP

(57) ABSTRACT

According to one embodiment, a broadcast request is received from a host that hosts an application that initiated a broadcast message to be broadcast to one or more DP accelerators of a plurality of DP accelerators coupled to the host, where the broadcast request includes one or more DP accelerator identifiers (IDs) identifying the one or more DP accelerators. A broadcast session key for a broadcast communication session to broadcast the broadcast message is received from the host. For each of the one or more DP accelerator IDs, a public key of a security key pair corresponding to the DP accelerator ID is identified. The broadcast message is encrypted using the broadcast session key. The broadcast session key is encrypted using the public key. The encrypted broadcast message and the encrypted broadcast session key are transmitted to a DP accelerator identified by the DP accelerator ID.

18 Claims, 13 Drawing Sheets

(51) Int. Cl.
*G06N 20/00* (2019.01)
*H04W 4/06* (2009.01)
*H04W 4/12* (2009.01)
*H04W 12/033* (2021.01)
*H04W 12/041* (2021.01)

(52) U.S. Cl.
CPC ........... *H04W 4/12* (2013.01); *H04W 12/033* (2021.01); *H04W 12/041* (2021.01)

(56) References Cited

U.S. PATENT DOCUMENTS

| | | | |
|---|---|---|---|
| 6,912,655 B1 | 6/2005 | Zucker | |
| 8,477,941 B1* | 7/2013 | Dhanoa | H04W 12/033 |
| | | | 455/411 |
| 10,813,001 B1* | 10/2020 | Ibarra | H04W 40/22 |
| 2004/0143645 A1 | 7/2004 | Cheenath | |
| 2006/0161502 A1 | 7/2006 | Cerruti et al. | |
| 2006/0248142 A1 | 11/2006 | Ishizaki et al. | |
| 2011/0072270 A1* | 3/2011 | Little | H04L 63/0823 |
| | | | 713/175 |
| 2014/0280627 A1 | 9/2014 | Ross | |
| 2015/0195261 A1* | 7/2015 | Gehrmann | H04L 9/0833 |
| | | | 726/7 |
| 2016/0044001 A1 | 2/2016 | Pogorelik | |
| 2018/0225237 A1 | 8/2018 | Edirisooriya et al. | |
| 2018/0343258 A1* | 11/2018 | Spies | H04L 63/101 |
| 2019/0140979 A1 | 5/2019 | Levi et al. | |
| 2019/0230094 A1* | 7/2019 | Pietea | G06F 9/542 |
| 2020/0073734 A1 | 3/2020 | Wang | |
| 2020/0323024 A1* | 10/2020 | Huang | H04W 4/06 |
| 2020/0389322 A1* | 12/2020 | Selander | H04L 12/18 |
| 2021/0176632 A1 | 6/2021 | Liu | |

OTHER PUBLICATIONS

Kurzak, J. et al.; Design and Implementation of the PULSAR Programming System for Large Scale Computing [online] 2017 [ retrieved on Feb. 7, 2022]; Supercomputing Frontiers and Innovations; (Year: 2017) Retrieved from the internet: <URL:https://www.research.manchester.ac.uk/portal/en/publications/design-and-implementation-of-the-pulsar-programming-system-for-large-scale-computing(4e594e04-2024-4614-a314-92e5eac92dfb).html (Year: 2017).

* cited by examiner

HOST_104 ADJACENCY TABLE 500

| ID 501 | Port 502 | Address 503 | Session Key 504 |
|---|---|---|---|
| DPA_105_ID | 0 | Base address | 0x4597A405... |
| DPA_106_ID | 1 | Base address + 4 | 0x12F7B475... |
| DPA_107_ID | 2 | Base address + 8 | 0x98B5C250... |

DPA_105 ADJACENCY TABLE 510

| ID 511 | Port 512 | Address 513 | Session Key 514 |
|---|---|---|---|
| HOST_104_ID | 0 | Base address | 0x4597A405... |
| DPA_106_ID | 1 | Base addr + 4 | Null |
| DPA_107_ID | 2 | Base addr + 8 | Null |
|  |  | Base addr + (Port*4) | Null |

DPA_106 ADJACENCY TABLE 520

| ID 521 | Port 522 | Address 523 | Session Key 524 |
|---|---|---|---|
| HOST_104_ID | 0 | Base address | 0x12F7B475... |
| DPA_105_ID | 1 | Base addr + 4 | Null |
| DPA_107_ID | 2 | Base addr + 8 | Null |
|  |  | Base addr + (Port*4) | Null |

DPA_106 ADJACENCY TABLE 530

| ID 531 | Port 532 | Address 533 | Session Key 534 |
|---|---|---|---|
| HOST_104_ID | 0 | Base address | 0x98B5C250... |
| DPA_105_ID | 1 | Base addr + 4 | Null |
| DPA_107_ID | 2 | Base addr + 8 | Null |
|  |  | Base addr + (Port*4) | Null |

FIG. 5 ions in the figures of the accompa-
SYSTEM AND METHOD TO SECURELY BROADCAST A MESSAGE TO ACCELERATORS

TECHNICAL FIELD

Embodiments of the present disclosure relate generally to artificial intelligence model training and inference. More particularly, embodiments of the disclosure relate to a system and method for a broadcast protocol to securely broadcast a message to data processing accelerators configured to communicate with each other.

BACKGROUND

Data processing accelerators (DPAs) that are configured to communicate with a host computing device generally cannot communicate securely with each other. Communication, e.g. peer-to-peer communication, between DPAs is useful so that two or more DPAs can cooperate and coordinate to perform a data processing task on behalf of a host computing device. However, it is important that DPAs communicate securely so that the processing task performed by cooperating DPAs is performed securely such that another computing entity may not alter a result produced by the communicating DPAs, and may not steal code or data from any of the communicating DPAs.

BRIEF DESCRIPTION OF THE DRAWINGS

Embodiments of the disclosure are illustrated by way of example and not limitation in the figures of the accompanying drawings in which like references indicate similar elements.

FIG. 5 is a block diagram illustrating secure communications adjacency tables between a host device and a plurality of data processing accelerators, according to an embodiment.

DETAILED DESCRIPTION

Figure 1:
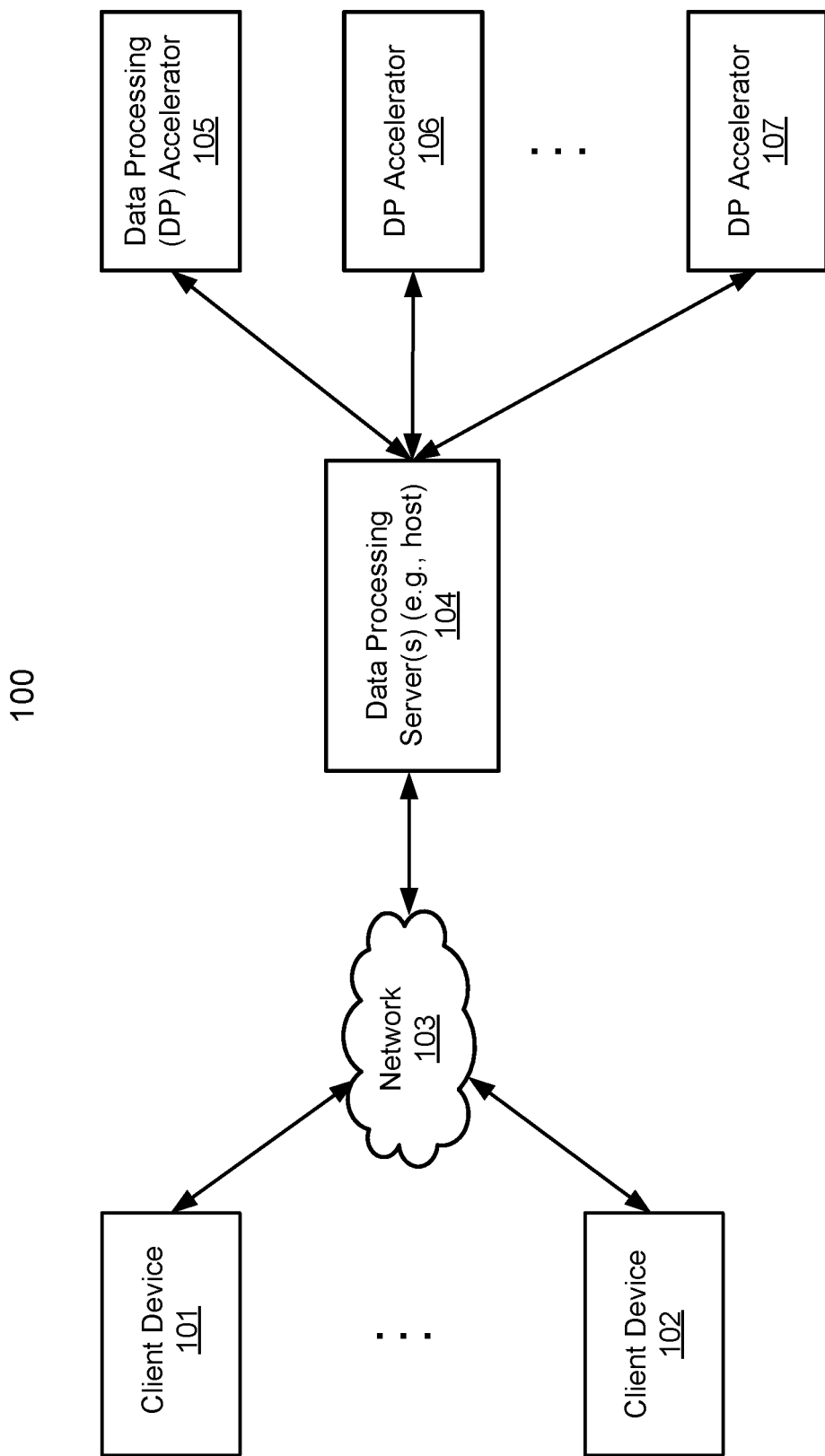
FIG. 1 is a block diagram illustrating a secure processing system, according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

The following embodiments relate to usage of a data processing (DP) accelerator to increase processing throughput of certain types of operations that may be offloaded (or delegated) from a host device to one or more DP accelerators. A DP accelerator can be a graphics processing unit (GPU), an artificial intelligence (AI) accelerator, math coprocessor, digital signal processor (DSP), or other type of processor. A DP accelerator can be a proprietary design, such as a Baidu® AI accelerator, or another GPU, and the like. While embodiments are illustrated and described with host device securely coupled to one or more DP accelerators, the concepts described herein can be implemented more generally as a distributed processing system.

The host device and the DP accelerator can be interconnected via a high-speed bus, such as a peripheral component interconnect express (PCIe), or other high-speed bus. The host device and DP accelerator can exchange keys and initiate a secure channel over the PCIe bus before performing operations of the aspects of the invention described below. Embodiments are described herein for generating one or more keys for securing communications between a host and a DP accelerator, and for securing communications between any two DP accelerators in a plurality of DP accelerators. In an embodiment, communications between any two DP accelerators use one or more keys that are unique with respect to any other two DP accelerators. Some of the operations include the DP accelerator using an artificial intelligence (AI) model to perform inferences using data provided by the host device. Before the AI model inferences are delegated to a DP accelerator, secure communication channels are established between the host and DP accelerator and between the DP accelerator and any other DP accelerator that may participate in the AI model inference.

Embodiments disclosed systems and methods to broadcast a message among DPAs. In one embodiment, the system receives a broadcast instruction from an application, the broadcast instruction designating one or more DP accelerators (e.g., a subset of DPAs) of a plurality of DP accelerators coupled to a host to receive a broadcast message. The system determines a broadcast session key for a broadcast communication session to broadcast the broadcast message. In one embodiment, the system determines one or more public keys of one or more security key pairs each associated with one of the designated DP accelerators. The system encrypts the broadcast message based on the broadcast session key and encrypts the broadcast session key based on the determined one or more public keys. The system broadcasts the encrypted broadcast message, and the one or more encrypted broadcast session keys to adjacent DP accelerators for propagation, where a designated DP accelerator decrypts the encrypted broadcast session key based on a corresponding private key associated with the designated DP accelerator, where the message is decrypted based on the broadcast session key.

Any of the above functionality can be programmed as executable instructions onto one or more non-transitory computer-readable media. When the executable instructions are executed by a processing system having at least one hardware processor, the processing systems causes the functionality to be implemented.

Any of the above functionality can be implemented by a processing system having at least one hardware processor, coupled to a memory programmed with executable instructions that, when executed, cause the processing system to implement the functionality.

FIG. 1 is a block diagram illustrating an example of system configuration for securing communication between a host 104 and data processing (DP) accelerators 105-107 according to some embodiments. Referring to FIG. 1, system configuration 100 includes, but is not limited to, one or more client devices 101-102 communicatively coupled to DP server 104 (e.g. host) over network 103. Client devices 101-102 may be any type of client devices such as a personal computer (e.g., desktops, laptops, and tablets), a "thin" client, a personal digital assistant (PDA), a Web enabled appliance, a Smart watch, or a mobile phone (e.g., Smartphone), etc. Alternatively, client devices 101-102 may be other servers. Network 103 may be any type of networks such as a local area network (LAN), a wide area network (WAN) such as the Internet, or a combination thereof, wired or wireless.

Server (e.g., host) 104 may be any kind of servers or a cluster of servers, such as Web or cloud servers, application servers, backend servers, or a combination thereof. Server 104 further includes an interface (not shown) to allow a client such as client devices 101-102 to access resources or services (such as resources and services provided by DP accelerators via server 104) provided by server 104. For example, server 104 may be a cloud server or a server of a data center that provides a variety of cloud services to clients, such as, for example, cloud storage, cloud computing services, artificial intelligence training services, data mining services, etc. Server 104 may be configured as a part of software-as-a-service (SaaS) or platform-as-a-service (PaaS) system over the cloud, which may be a private cloud, public cloud, or a hybrid cloud. The interface may include a Web interface, an application programming interface (API), and/or a command line interface (CLI).

For example, a client, in this example, a user application of client device 101 (e.g., Web browser, application), may send or transmit an instruction (e.g., artificial intelligence (AI) training, inference instruction, etc.) for execution to server 104 and the instruction is received by server 104 via the interface over network 103. In response to the instruction, server 104 communicates with DP accelerators 105-107 to fulfill the execution of the instruction. In some embodiments, the instruction is a machine learning type of instruction where DP accelerators, as dedicated machines or processors, can execute the instruction many times faster than execution by server 104. Server 104 thus can control/manage an execution job for the one or more DP accelerators in a distributed fashion. Server 104 then returns an execution result to client devices 101-102. A DP accelerator or AI accelerator may include one or more dedicated processors such as a Baidu® artificial intelligence (AI) chipset available from Baidu, Inc.® or alternatively, the DP accelerator may be an AI chipset from another AI chipset provider.

According to one embodiment, each of the applications accessing any of DP accelerators 105-107 hosted by data processing server 104 (also referred to as a host) may verify that the application is provided by a trusted source or vendor. Each of the applications may be launched and executed within a trusted execution environment (TEE) specifically configured and executed by a central processing unit (CPU) of host 104. When an application is configured to access any one of the DP accelerators 105-107, an obscured connection can be established between host 104 and the corresponding one of the DP accelerator 105-107, such that the data exchanged between host 104 and DP accelerators 105-107 is protected against attacks from malware/intrusions.

Figure 2A:
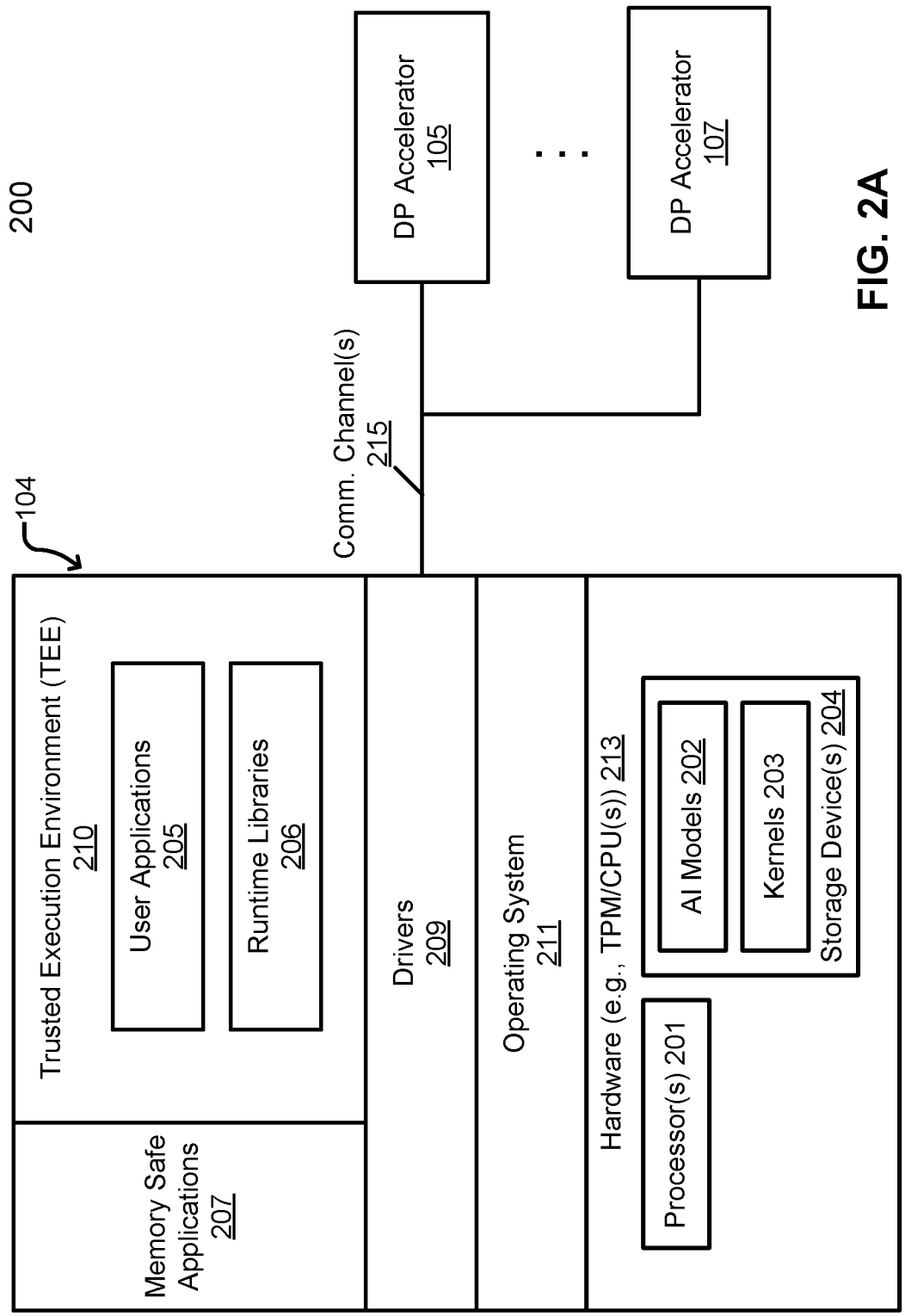
FIGS. 2A and 2B are a block diagrams illustrating a secure computing environment between one or more hosts and one or more data processing accelerators, according to one embodiment.

FIG. 2A is a block diagram illustrating an example of a multi-layer protection solution for obscured communications between a host system 104 and data process (DP) accelerators 105-107 according to some embodiments. In one embodiment, system 200 provides a protection scheme for obscured communications between host 104 and DP accelerators 105-107 with or without hardware modifications to the DP accelerators. Referring to FIG. 2A, host machine or server 104 can be depicted as a system with one or more layers to be protected from intrusion such as user application(s) 205, runtime libraries 206, driver 209, operating system 211, and hardware 213 (e.g., security module (trusted platform module (TPM))/central processing unit (CPU)). Memory safe applications 207 can run in a sandboxed memory. Below the applications 205 and run-time libraries 206, one or more drivers 209 can be installed to interface to hardware 213 and/or to DP accelerators 105-107.

Hardware 213 can include one or more processor(s) 201 and storage device(s) 204. Storage device(s) 204 can include one or more artificial intelligence (AI) models 202, and one or more kernels 203. Kernels 203 can include signature kernels, watermark-enabled kernels, encryption and/or decryption kernels, and the like. A signature kernel, when executed, can digitally sign any input in accordance with the programming of the kernel. A watermark-enabled kernel can extract a watermark from a data object (e.g. an AI model or other data object). A watermark-enabled kernel can also implant a watermark into an AI model, an inference output, or other data object. A watermark kernel (e.g. a watermark inherited kernel) can inherit a watermark from another data object and implant that watermark into a different object, such as an inference output or an AI model. A watermark, as used herein, is an identifier associated with, and can be implanted into, an AI model or an inference generated by an AI model. For example, a watermark may be implanted in one or more weight variables or bias variables. Alternatively, one or more nodes (e.g., fake nodes that are not used or unlikely used by the artificial intelligence model) may be created to implant or store the watermark.

Host machine 104 is typically a CPU system which can control and manage execution of jobs on the host machine 104 and/or DP accelerators 105-107. In order to secure/obscure a communication channel 215 between DP accelerators 105-107 and host machine 104, different components may be required to protect different layers of the host system that are prone to data intrusions or attacks. For example, a trusted execution environment (TEE) can protect the user application 205 layer and the runtime library 206 layer from data intrusions.

System 200 includes host system 104 and DP accelerators 105-107 according to some embodiments. DP accelerators can include Baidu® AI chipsets or another AI chipset such as a graphical processing units (GPUs) that can perform artificial intelligence (AI)-intensive computing tasks. In one embodiment, host system 104 includes a hardware that has one or more CPU(s) 213 equipped with a security module (such as a trusted platform module (TPM)) within host machine 104. A TPM is a specialized chip on an endpoint device that stores cryptographic keys (e.g., RSA cryptographic keys) specific to the host system for hardware authentication. Each TPM chip can contain one or more RSA key pairs (e.g., public and private key pairs) called endorsement keys (EK) or endorsement credentials (EC), i.e., root keys. The key pairs are maintained inside the TPM chip and cannot be accessed by software. Critical sections of firmware and software can then be hashed by the EK or EC before they are executed to protect the system against unauthorized firmware and software modifications. The TPM chip on the host machine can thus be used as a root of trust for secure boot. The TPM chip can include a secure memory for storing keys that are rooted, e.g. in hardware, and keys that are derived from the rooted keys. In an embodiment, secure storage can include a rooted asymmetric key pair (RK): a public key (PK_RK) and a private key (SK_RK) of the asymmetric rooted key (RK) pair.

The TPM chip also secure driver(s) 209 and operating system (OS) 211 in a working kernel space to communicate with the DP accelerators 105-107. Here, driver 209 is provided by a DP accelerator vendor and can serve as a driver for the user application to control a communication channel(s) 215 between host and DP accelerators. Because the TPM chip and secure boot processor protects the OS 211 and drivers 209 in their kernel space, TPM also effectively protects the driver 209 and OS 211.

Since communication channels 215 for DP accelerators 105-107 may be exclusively occupied by the OS 211 and driver 209, thus, communication channels 215 can be secured through the TPM chip. In one embodiment, communication channels 215 include a peripheral component interconnect or peripheral component interconnect express (PCIE) channel. In one embodiment, communication channels 215 are obscured communication channels. Communication channels may be connected to one or more hardware communication ports, accessible by drivers 209, for communicating over communication channels 215 with DP accelerators 105-107. Communication channels 215 may be secured using a session key as described herein. Each communication channel 215 may be secured using a different session key than other communication channels 215. Drivers 209 may include an adjacency table that maps DP accelerators 105-107 each to a hardware communication port, and a session key associated with each hardware communication port.

Host machine 104 can include trusted execution environment (TEE) 210 which is enforced to be secure by TPM/CPU 213. A TEE is a secure environment. TEE can guarantee code and data which are loaded inside the TEE to be protected with respect to confidentiality and integrity. Examples of a TEE may be Intel® software guard extensions (SGX), or AMD® secure encrypted virtualization (SEV). Intel® SGX and/or AMD® SEV can include a set of central processing unit (CPU) instruction codes that allows user-level code to allocate private regions of memory of a CPU that are protected from processes running at higher privilege levels. Here, TEE 210 can protect user applications 205 and runtime libraries 206, where user application 205 and runtime libraries 206 may be provided by end users and DP accelerator vendors, respectively. Here, runtime libraries 206 can convert application programming interface (API) calls to commands for execution, configuration, and/or control of the DP accelerators. In one embodiment, runtime libraries 206 provides a predetermined set of (e.g., predefined) kernels for execution by the user applications. In an embodiment, the kernels may be stored in storage device(s) 204 as kernels 203.

Host machine 104 can include memory safe applications 207 which are implemented using memory safe languages such as Rust, and GoLang, etc. These memory safe applications running on memory safe Linux® releases, such as MesaLock Linux®, can further protect system 200 from data confidentiality and integrity attacks. However, the operating systems may be any Linux® distributions, UNIX®, Windows® OS, or Mac® OS.

The host machine 104 can be set up as follows: A memory safe Linux® distribution is installed onto a system equipped with TPM secure boot. The installation can be performed offline during a manufacturing or preparation stage. The installation can also ensure that applications of a user space of the host system are programmed using memory safe programming languages. Ensuring other applications running on host system 104 to be memory safe applications can further mitigate potential confidentiality and integrity attacks on host system 104.

After installation, the system can then boot up through a TPM-based secure boot. The TPM secure boot ensures only a signed/certified operating system and accelerator driver are launched in a kernel space that provides the accelerator services. In one embodiment, the operating 211 system can be loaded through a hypervisor (not shown). A hypervisor or a virtual machine manager is a computer software, firmware, or hardware that creates and runs virtual machines. A kernel space is a declarative region or scope where kernels (i.e., a predetermined set of (e.g., predefined) functions for execution) are identified to provide functionalities and services to user applications. In the event that integrity of the system is compromised, TPM secure boot may fail to boot up and instead shuts down the system.

After secure boot, runtime libraries 206 runs and creates TEE 210, which places runtime libraries 206 in a trusted memory space associated with CPU 213. Next, user application 205 is launched in TEE 210. In one embodiment, user application 205 and runtime libraries 206 are statically linked and launched together. In another embodiment, runtime library 206 is launched in TEE 210 first and then user application 205 is dynamically loaded in TEE 210. In another embodiment, user application 205 is launched in TEE first, and then runtime 206 is dynamically loaded in TEE 210. Statically linked libraries are libraries linked to an application at compile time. Dynamic loading can be performed by a dynamic linker. Dynamic linker loads and links shared libraries for running user applications at runtime. Here, user applications 205 and runtime libraries 206 within TEE 210 are visible to each other at runtime, e.g., all process data are visible to each other. However, external access to the TEE is denied.

In one embodiment, the user application 205 can only call a kernel from a set of kernels as predetermined by runtime libraries 206. In another embodiment, user application 205 and runtime libraries 206 are hardened with side channel free algorithm to defend against side channel attacks such as cache-based side channel attacks. A side channel attack is any attack based on information gained from the implementation of a computer system, rather than weaknesses in the implemented algorithm itself (e.g. cryptanalysis and software bugs). Examples of side channel attacks include cache attacks which are attacks based on an attacker's ability to monitor a cache of a shared physical system in a virtualized environment or a cloud environment. Hardening can include masking of the cache, outputs generated by the algorithms to be placed on the cache. Next, when the user application finishes execution, the user application terminates its execution and exits from the TEE.

In one embodiment, TEE 210 and/or memory safe applications 207 are not necessary, e.g., user application 205 and/or runtime libraries 206 are hosted in an operating system environment of host 104.

In one embodiment, the set of kernels include obfuscation kernel algorithms. In one embodiment, the obfuscation kernel algorithms can be symmetric or asymmetric algorithms. A symmetric obfuscation algorithm can obfuscate and de-obfuscate data communications using a same algorithm. An asymmetric obfuscation algorithm requires a pair of algorithms, where a first of the pair is used to obfuscate and the second of the pair is used to de-obfuscate, or vice versa. In another embodiment, an asymmetric obfuscation algorithm includes a single obfuscation algorithm used to obfuscate a data set but the data set is not intended to be de-obfuscated, e.g., there is absent a counterpart de-obfuscation algorithm. Obfuscation refers to obscuring of an intended meaning of a communication by making the communication message difficult to understand, usually with confusing and ambiguous language. Obscured data is harder and more complex to reverse engineering. An obfuscation algorithm can be applied before data is communicated to obscure (cipher/decipher) the data communication reducing a chance of eavesdrop. In one embodiment, the obfuscation algorithm can further include an encryption scheme to further encrypt the obfuscated data for an additional layer of protection. Unlike encryption, which may be computationally intensive, obfuscation algorithms may simplify the computations. Some obfuscation techniques can include but are not limited to, letter obfuscation, name obfuscation, data obfuscation, control flow obfuscation, etc. Letter obfuscation is a process to replace one or more letters in a data with a specific alternate letter, rendering the data meaningless. Examples of letter obfuscation include a letter rotate function, where each letter is shifted along, or rotated, a predetermine number of places along the alphabet. Another example is to reorder or jumble up the letters based on a specific pattern. Name obfuscation is a process to replace specific targeted strings with meaningless strings. Control flow obfuscation can change the order of control flow in a program with additive code (insertion of dead code, inserting uncontrolled jump, inserting alternative structures) to hide a true control flow of an algorithm/AI model. Systems and methods for sharing keys used for obfuscation are described herein, below.

In summary, system 200 provides multiple layers of protection for DP accelerators (for data transmissions including machine learning models, training data, and inference outputs) from loss of data confidential and integrity. System 200 can include a TPM-based secure boot protection layer, a TEE protection layer, and a kernel validation/verification layer. Furthermore, system 200 can provide a memory safe user space by ensuring other applications on the host machine are implemented with memory safe programming languages, which can further eliminate attacks by eliminating potential memory corruptions/vulnerabilities. Moreover, system 200 can include applications that use side-channel free algorithms so to defend against side channel attacks, such as cache based side channel attacks.

Runtime 206 can provide obfuscation kernel algorithms to obfuscate data communication between a host 104 and DP accelerators 105-107. In one embodiment, the obfuscation can be pair with a cryptography scheme. In another embodiment, the obfuscation is the sole protection scheme and cryptography-based hardware is rendered unnecessary for the DP accelerators.

Figure 2B:
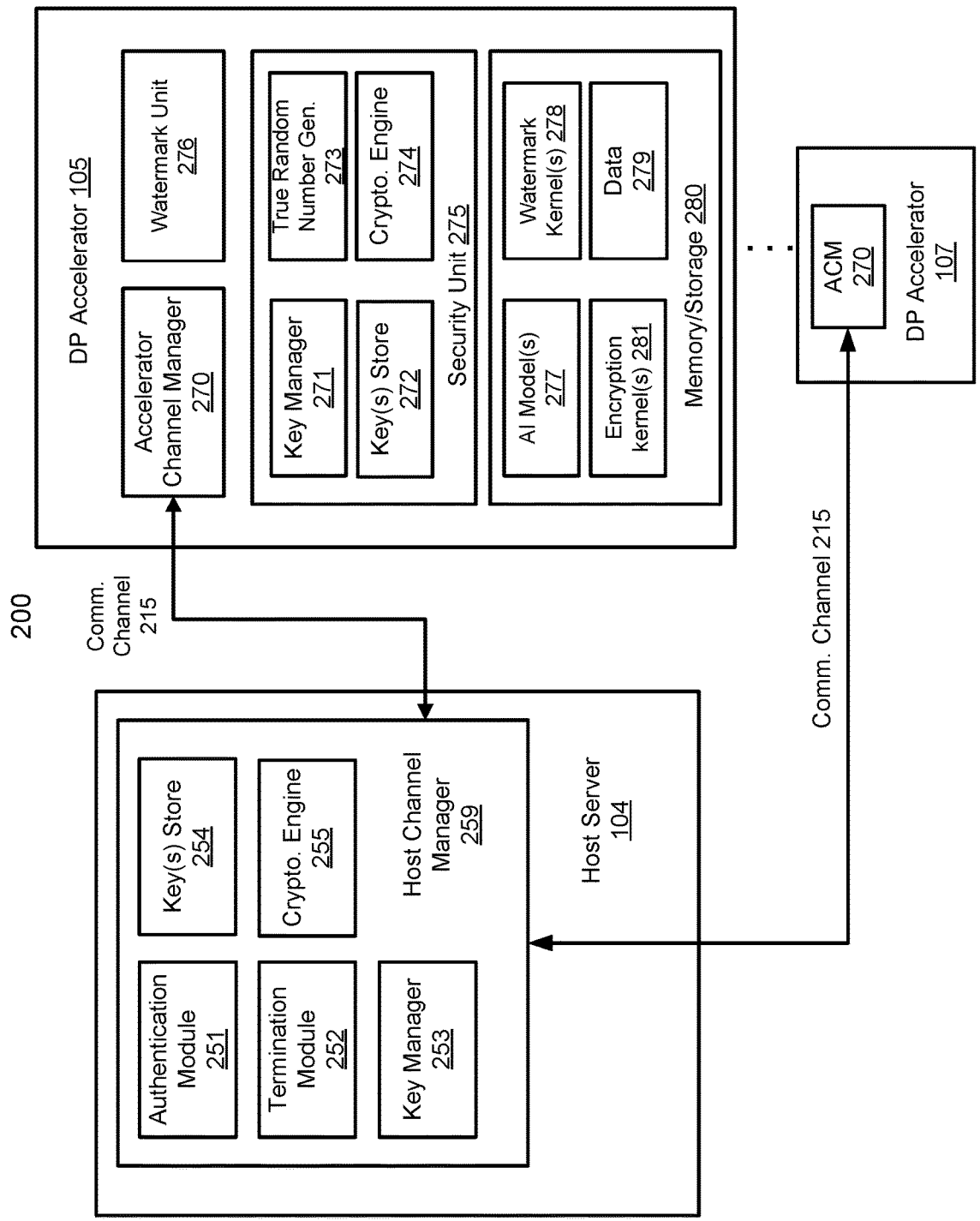

FIG. 2B is a block diagram illustrating an example of a host channel manager (HCM) 259 communicatively coupled to one or more accelerator channel managers (ACMs) 270 that interface to DP accelerators 105-107, according to some embodiments. Referring to FIG. 2B, in one embodiment, HCM 259 includes authentication module 251, termination module 252, key manager 253, key(s) store 254, and cryptography engine 255. Authentication module 251 can authenticate a user application running on host server 104 for permission to access or use a resource of a DP accelerator 105. Termination module 252 can terminate a connection (e.g., channels associated with the connection would be terminated). Key manager 253 can manage (e.g., create or destroy) asymmetric key pairs or symmetric keys for encryption/decryption of one or more data packets for different secure data exchange channels. Here, each user application (as part of user applications 205 of FIG. 2A) can correspond or map to different secure data exchange channels, on a one-to-many relationship, and each data exchange channel can correspond to a DP accelerator 105. Each application can utilize a plurality of session keys, where each session key is for a secure channel corresponding to a DP accelerator (e.g., accelerators 105-107). Key(s) store 254 can store encryption asymmetric key pairs or symmetric keys. Cryptography engine 255 can encrypt or decrypt a data packet for the data exchanged through any of the secure channels. Note that some of these modules can be integrated into fewer modules.

In one embodiment, DP accelerator 105 includes ACM 270 and security unit (SU) 275. Security unit 275 can include key manager 271, key(s) store 272, true random number generator 273, and cryptography engine 274. Key manager 271 can manage (e.g., generate, safe keep, and/or destroy) asymmetric key pairs or symmetric keys. Key(s) store 272 can store the cryptography asymmetric key pairs or symmetric keys in secure storage within the security unit 275. True random number generator 273 can generate seeds for key generation and cryptographic engine 274 uses. Cryptography engine 274 can encrypt or decrypt key information or data packets for data exchanges. In some embodiments, ACM 270 and SU 275 is an integrated module.

DP accelerator 105 can further includes memory/storage 280 that can store artificial intelligence model(s) 277, watermark kernel(s) 278 (including inherited watermark kernels watermark-enabled kernels, watermark-signature kernels, et al.), encryption and decryption kernels 281, and data 279. HCM 259 can communicate with ACM 270 via communication channel 215.

Figure 3:
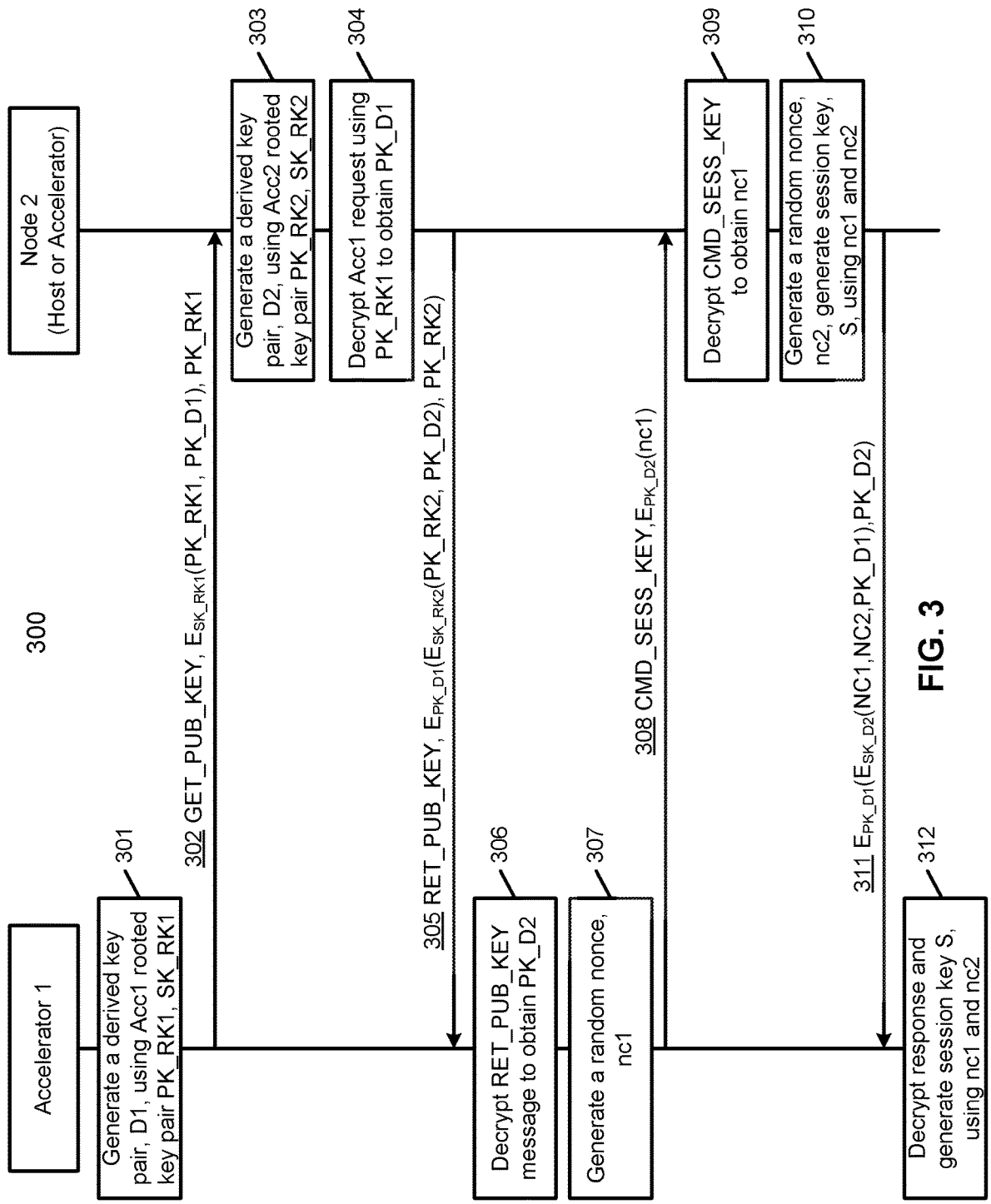
FIG. 3 is a block diagrams illustrating a method of a host and data processing accelerator, or two data processing accelerators, generating a session key for securing communications, according to an embodiment.

FIG. 3 is a block diagrams illustrating a method 300 of a host and data processing accelerator, or two data processing accelerators, generating a session key for securing communications, according to an embodiment. Method 300 can be used between a first data processing (DP) accelerator "Accelerator 1" and a second node, "Node 2." Node 2 can be either a host device or second DP accelerator. Accelerator 1 has a rooted key pair PK_RK1 and SK_RK1. PK_RK1 is a public key of a rooted asymmetric key pair of Accelerator 1 (RK1). SK_RK1 is a private (secret) key (SK) of rooted asymmetric key pair of Accelerator 1 (RK1). Rooted key pair RK1 is stored in a secured storage of Accelerator 1. Similarly, Node 2 (either a host or another DP accelerator) has a rooted key pair PK_RK2 and SK_RK2. RK2 can be stored in a secure storage of Node 2.

In operation 301, Accelerator 1 generates a derived asymmetric key pair, PK_D1 and SK_D1, from rooted key pair PK_RK1 and SK_RK1. Deriving an asymmetric key pair is known in the art and will not be described herein.

In operation 302, Accelerator 1 sends to Node 2, a "Get Public Key" command (GET_PUB_KEY) to request a public key of Node 2. The GET_PUB_KEY includes encrypting two of Accelerator 1's public keys: PK_RK1 and PK_D1. In an embodiment, PK_RK1 and PK_D1 can be encrypting using Accelerator 1's private rooted key SK_RK1. The GET_PUB_KEY command further includes Accelerator 1's public rooted key, PK_RK1 in clear-text form. Node 2 can decrypt Accelerator 1's encrypted keys using PK_RK1 and verify that the GET_PUB_KEY request did, in fact, come from Accelerator 1.

In operation 303, Node 2 generates a derived asymmetric key pair PK_D2 and SK_D2 from Node 2's rooted key pair PK_RK2 and SK_RK2. Derived keys PK_D2 and SK_D2 can be stored in secure storage at Node 2.

In operation 304, Node 2 can decrypt the received "GET_PUB_KEY" command from Accelerator 1, using the clear-text public rooted key of Accelerator 1: PK_RK1. Once decrypted, Node 2 obtains Accelerator 1's derived public key: PK_D1.

In operation 305, Node 2 sends to Accelerator 1 a "Return Public Key" (RET_PUB_KEY) message. The message includes Node 2's PK_RK2 and PK_D2, encrypted using Node 2's private rooted key, SK_RK2. Node 2's public rooted key PK_RK2 is packaged with the encrypted keys PK_RK2 and PK_D2, and packaged keys are then encrypted using Accelerator 1's derived public key PK_D1.

In operation 306, Accelerator 1 decrypts the RET_PUB_KEY message using Accelerator 1's private derived key SK_D1. After decryption, Accelerator 1 can obtain Node 2's public rooted key, PK_RK2. Accelerator 1 then decrypts the encrypted keys PK_RK2 and PK_D2 using Node 2's newly-obtained public rooted key, PK_RK2. Accelerator 1 can then obtain Node 2's derived public key, PK_D2. In an embodiment, Accelerator 1 can verify PK_RK2 either, or both, the decrypted PK_RK2 and cleartext PK_RK2 by checking with the host device or a history copy of PK_RK2.

In operation 307, Accelerator 1 can generate a nonce, "nc1."

In operation 308, Accelerator 1 can send a command "Generate Session Key" (CMD_SESS_KEY) to Node 2. The command includes nonce nc1, encrypted using Node 2's public derived key PK_D2. CMD_SESS_KEY instructs Node 2 to generate a session key from Accelerator 1's nonce nc1 and a nonce nc2 that is generated by Node 2.

In operation 309, Node 2 can decrypt nonce nc1 in the received CMD_SESS_KEY using Node 2's private derived key SK_D2.

In operation 310, Node 2 can generate a nonce, nc2. Node 2 can then generate a session key, based on nonces nc1 and nc2. Node 2 stores the session key in an adjacency table of Node 2. The session key is stored in association with Accelerator 1 and a unique identifier of Accelerator 1.

In operation 311, Node 2 can send nonce nc2 to Accelerator 1. Node 2 packages nc1, nc2, and PK_D1 in a first package and encrypts the first package using Node 2's private derived key, SR_D2. Node 2 then adds PK_D2 to the encrypted first package, and generates a second encrypted package that is encrypted using Accelerator 1's public derived key, PK_D1. The encrypted second package is then transmitted to Accelerator 1.

In operation 312, Accelerator 1 receives the encrypted second package from Node 2 and decrypts the second package using Accelerator 1's derived private key, SK_D1. Accelerator 1 can then remove PK_D2 from the decrypted second package, leaving just the encrypted first package. In an embodiment, Accelerator 1 can verify that PK_D2 removed from the decrypted second package matches the PK_D2 previously received in operation 305 and decrypted in operation 306, above. Accelerator 1 can also verify that the nc1 obtained from the decrypted first package, and previously sent to Node 2 in operation 308, has not expired (aka, "verify freshness"). Accelerator 1 can then generate a session key based upon nonces nc1 and nc2. Accelerator 1 can store the generated session key in Accelerator 1's adjacency table, in association with a unique identifier of the Node 2 and the session key.

At this point, both Accelerator 1 and Node 2 have a same session key that was derived from nonces nc1 and nc2 Both Accelerator 1 and Node 2 have stored the session key in their respective adjacency tables. Adjacency tables are described in detail, below, with reference to FIG. 5.

Figure 4:
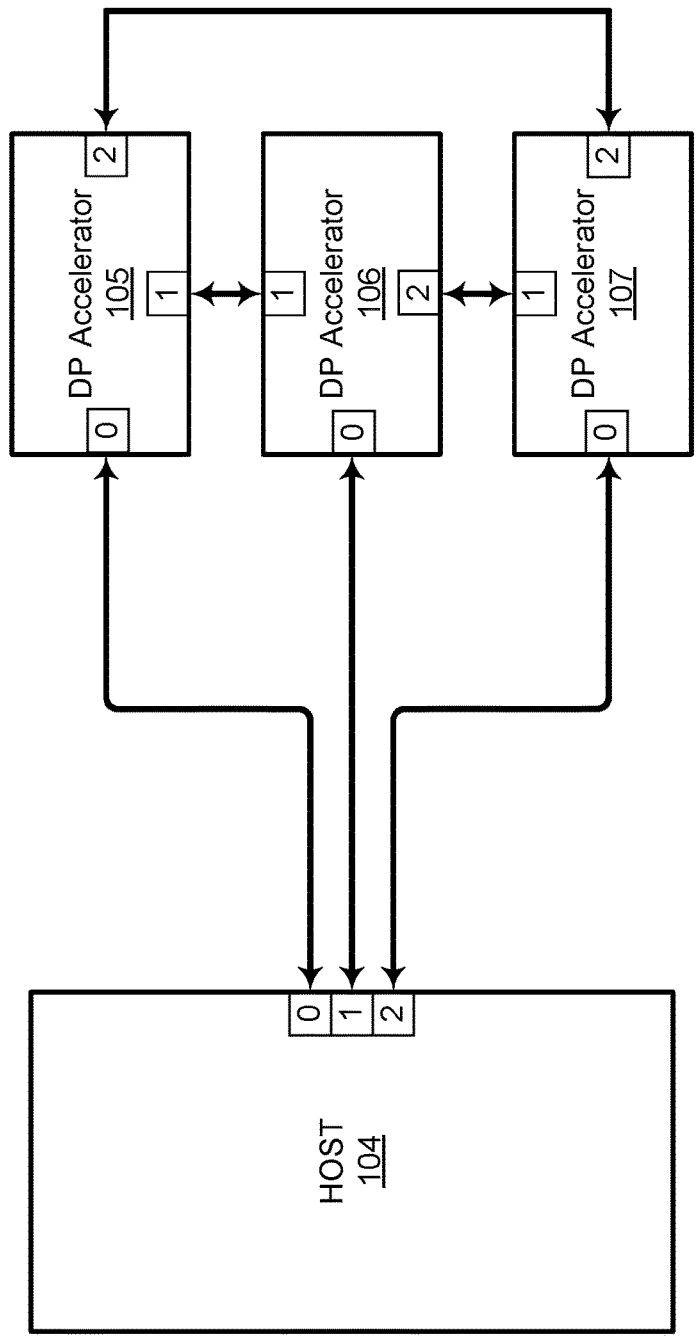
FIG. 4 is a block diagram illustrating a hardware configuration of a host computing device and a plurality of data processing accelerators that securely communicate with one another, according to an embodiment.

FIG. 4 is a block diagram illustrating a hardware configuration 400 of a host computing device 104 and a plurality of data processing accelerators 105-107 that securely communicate with one another, according to an embodiment.

Host 104 is communicatively coupled to each of DP accelerator 105, 106, and 107. Host 104 includes a communication interface having, e.g., ports 0, 1, and 2. In FIG. 4, DP accelerator 105's communication port 0 is communicatively coupled to host 104's communication port 0. DP accelerator 106's communication port 0 is communicatively coupled to host 104's communication port 1. DP accelerator 107's communication port 0 is communicatively coupled to host 104's communication port 2. DP accelerator's 105-107 are also communicatively coupled to each other. DP accelerator 105's communication port 1 is communicatively coupled to DP accelerator 106's communication port 1. DP accelerator 105's communication port 2 is communicatively coupled to DP accelerator 107's communication port 2. DP accelerator 106's communication port 2 is communicatively coupled to DP accelerator 107's communication port 1. Each of the foregoing communication channels is secured by a different session key for the other communication channels. Thus, is any one of the communication channels is compromised, the other communication channels are still secure. Further, there is redundancy in communication with respect to the host device 104. Each DP accelerator 105-107 can monitor their own communication ports to ensure that the each communication channel is operable. If a channel fails, one or both of the DP accelerators at either end of the channel can notify the host 104 of the failed communication channel.

Each of the host 104, and DP accelerator 105, 106, and 107, can have an adjacency table that stores a list of nodes (DP accelerators or host) that the host 104 or DP accelerator 105-107 is communicatively coupled to. Adjacency tables are described below, with reference to FIG. 5.

FIG. 5 is a block diagram illustrating secure communications adjacency tables 500, 510, 520, and 530 between a host device 104 and a plurality of data processing (DP) accelerators 105-107, according to an embodiment.

As shown in FIG. 4, above, host 104 and DP accelerators 105-107 are communicatively coupled via communication ports on each of the host and DP accelerators. Host 104, e.g., can have an adjacency table 500 that lists the DP accelerators (DPA) that are communicatively coupled to host 104. DP accelerators, e.g. 105-107, can have a unique ID 501, e.g. DP_105_ID, etc., so that the DP accelerator can be referred to by name. In an embodiment, when a host wants to send a message to a DP accelerator, the message can have the format [source, message_payload, destination]. Host can refer to itself, as sender, by its own ID 501 e.g. HOST_104_ID. Host can refer to a destination DP accelerator by its unique ID 501, by a port 502 to which the DP accelerator is connected at the host, or by the address 503 in memory to which DP accelerator port is connected at the host. Thus, if host having ID 501 of HOST_104_ID sends a message to DP accelerator 106, the host can look up the ID 501 of DP accelerator 106, or the port 502, or address of the port 503 to use as the destination address for the message. The message can be encrypted using the session key 504 for the host and DP accelerator 106. Similarly, DP accelerator 105 can have an adjacency table 510, stored in memory of DP accelerator 105, indicating an ID, port 512, address 513, and session key 514 for communicating with each of host 104, DP accelerator 106, or DP accelerator 107. DP accelerator 106 can have an adjacency table 520, stored in memory of DP accelerator 106, indicating an ID 521, port 522, address 523, and session key 524 for communicating with each of host 104, DP accelerator 105, and DP accelerator 107. DP accelerator 107 can have an adjacency table 530, stored in memory of DP accelerator 107, indicating an ID 531, port 532, address 533, and session key 534 of host 104, DP accelerator 105, and DP accelerator 107.

Determining and generating session keys for each channel between two devices (host to DP accelerator, or DP accelerator to DP accelerator) are described above with reference to FIG. 3, and a method is described below with reference to FIG. 6. A session key of NULL indicates that the session key has not yet been determined between the two nodes (host or DP accelerator) referenced in the line item of the adjacency table having the NULL session key. For example, DP accelerator 106 adjacency table 520 indicates a line item for DP accelerator 105, having unique ID DPA_105_ID, and a null session identifier. The null session identifier indicates that DP accelerator 106 and DP accelerator 105 have not yet determined a session key for communication between DP accelerator 106 and DP accelerator 105.

Figure 6:
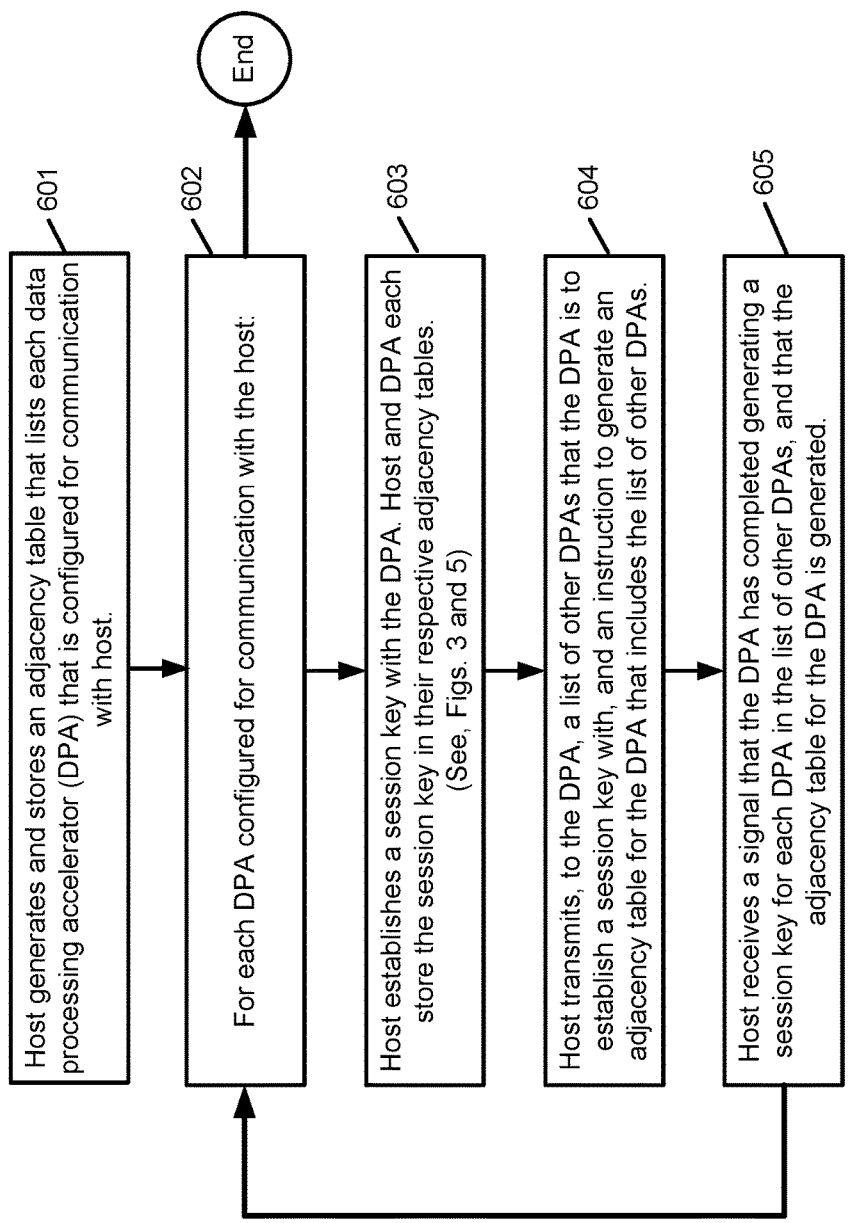
FIG. 6 is block diagrams illustrating a method 600 of a host device instructing a plurality of data processing accelerators to configure themselves for secure communications, according to an embodiment.

FIG. 6 is block diagrams illustrating a method of a host device instructing a plurality of data processing accelerators to configure themselves for secure communications, according to an embodiment.

In operation 601, a host, e.g. host 104, generates and stores an adjacency table that lists each DP accelerator that is configured for communication with the host. In an embodiment, one or more DP accelerators can be configured by a system administrator using a configuration file. The configuration file can indicate which DP accelerators can communicate with which other DP accelerators. The configuration file can specify the unique identifier for the host and DP accelerators, the specific communication port number to which each DP accelerator is assigned, and/or the memory address corresponding to the host communication port number associated with the DP accelerator. There can be any number of DP accelerators. For simplicity, one host, 104, and three DP accelerators, e.g. 105-107, are described. The generated adjacency table for the host can be similar to host table 500, described above with reference to FIG. 5.

In operation 602, logic in the host can iterate through the list of DP accelerators configured for the host. For each DP accelerator, operations 603 through 605 can be performed. In there are no more DP accelerators in the list, then method 600 ends.

In operation 603, host selects a DP accelerator from the list and generates a session key with the selected DP accelerator. Generating a session key between an accelerator and a host (Node) is described above with reference to FIG. 3. Host stores the generated session key in an entry in the adjacency table corresponding to the selected DP accelerator. Host uses the configuration file complete the entry in the adjacency table, including the unique identifier of the DP accelerator, the port number of the host for communicating with the DP accelerator, and the memory address of the port. In an embodiment, the memory address can be calculated from a base address of the communication ports, and an offset in memory for each port number.

In operation 604, host transmits instructions to the selected DP accelerator for the DP accelerator to create its own adjacency table. The information in the host-transmitted instructions can be obtained from the configuration file. The instructions include a list of other DP accelerators that the selected DP accelerator is to include when the selected DP accelerator generates its own adjacency table. The instructions can further include a unique identifier of each of the other DP accelerators, a port number of the selected DP accelerator to assign to each of the other DP accelerators, a memory address to assign to each of the other DP accelerators, and a NULL value for the session key associated with each of the other DP accelerators. The instructions further include an instruction that the selected DP accelerator is to generate its own adjacency table, and to generate and store a session key with each of the other DP accelerators in the adjacency table of the selected DP accelerator. A method for a selected DP accelerator to generate its own adjacency table is described below with reference to FIG. 7.

In operation 605, host receives a signal from the selected DP accelerator that the selected DP accelerator has generated its own adjacency table, populated the adjacency table with the information provided in operation 604, above, and has generated and stored a session key for each of the other DP accelerators in the selected DP accelerator's adjacency table. Method 600 continues at operation 602.

Figure 7:
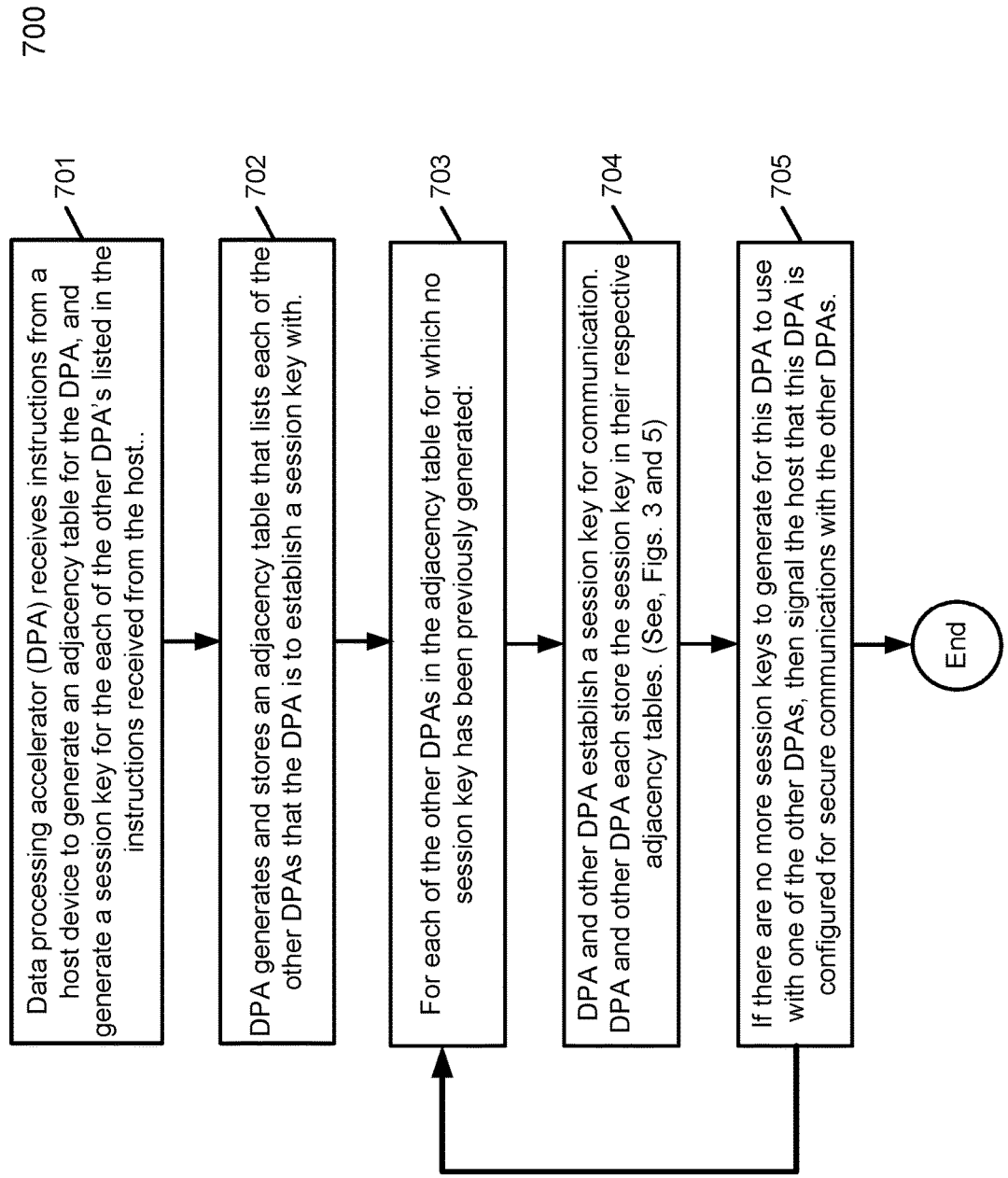
FIG. 7 is a block diagram illustrating a method 700 of a data processing accelerator configuring itself for secure communication with one or more other data processing accelerators, according to an embodiment.

FIG. 7 is a block diagram illustrating a method 700 of a data processing accelerator configuring itself for secure communication with one or more other data processing accelerators, according to an embodiment.

In operation 701, a DP accelerator ("this" DP accelerator) receives instructions from a host device to generate an adjacency table for this DP accelerator. The information in the host-transmitted instructions can be obtained by the host from an administrator-created configuration file. In an embodiment, the instructions can be default instructions. The instructions include a list of other DP accelerators that the DP accelerator is to include when this DP accelerator generates its own adjacency table. The instructions can further include a unique identifier of each of the other DP accelerators, a port number of this DP accelerator to assign to each of the other DP accelerators in the instructions, a memory address to assign to each of the other DP accelerators, and a NULL value for the session key associated with each of the other DP accelerators. The instructions further include an instruction that the DP accelerator is to generate its own adjacency table, and to generate and store a session key with each of the other DP accelerators in the adjacency table of this DP accelerator.

In operation 702, the DP accelerator stores the adjacency table that lists each of the other DP accelerators that this DP accelerator is to generate and store a session key for.

In operation 703, logic of the DP accelerator iterates through the list of other DP accelerators. If there are more DP accelerators in the list of other DP accelerators, then the logic selects a next DP accelerator from the list.

In operation 704, the ("this") DP accelerator and the selected DP accelerator generate a session key for use in communicating between this DP accelerator and the selected DP accelerator. Generating a session key between a DP accelerator and a node (host or DP accelerator) is described above with reference to FIG. 3. DP accelerator logic stores the session key in its adjacency table for this DP accelerator, in association with the selected DP accelerator.

In operation 705, if there are no more DP accelerators in the list, and thus no more session keys to generate, then this DP accelerator transmits a message or signal to the host that this DP accelerator has finished generating its adjacency table and has generated a session key for secure communication with each of the other DP accelerators in the adjacency table. In an embodiment, each session key in the adjacency table is different than other session keys in the adjacency table.

Figure 8:
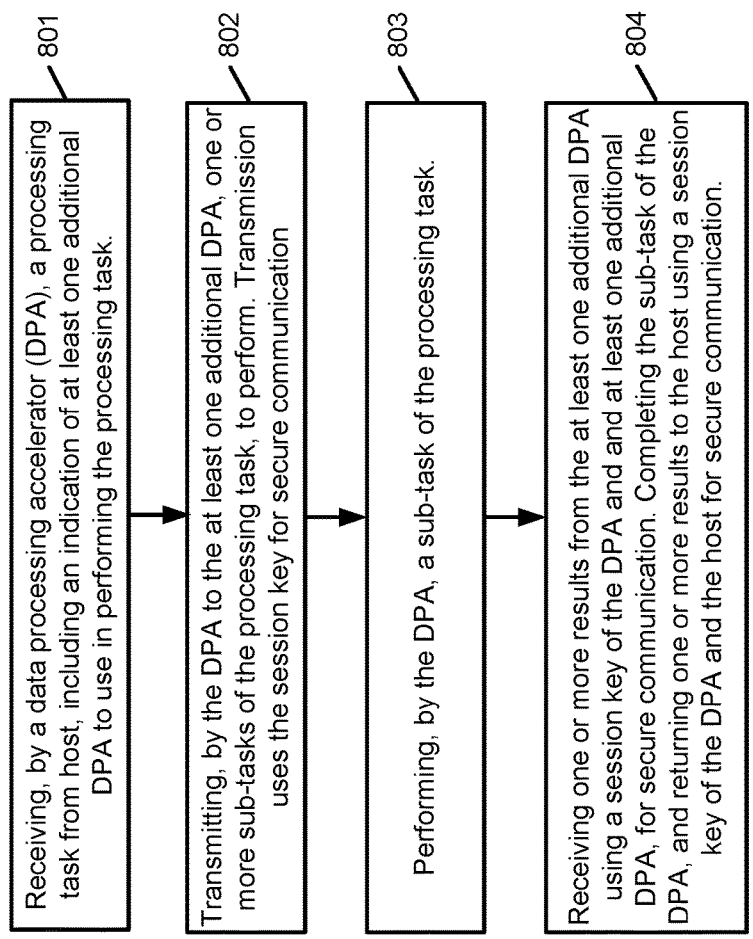
FIG. 8 is block diagram illustrating a method of a data processing accelerator receiving a processing task from a host and performing one or more sub-tasks of the tasks by one or more additional data processing accelerators, according to an embodiment.

FIG. 8 is block diagram illustrating a method 800 of a data processing accelerator receiving a processing task from a host and performing one or more sub-tasks of the tasks by one or more additional data processing accelerators, according to an embodiment.

In operation 801, a DP accelerator receives a processing task from a host device. In an embodiment, the processing task includes instructions on dividing the processing task into sub-tasks that are to be processed on at least on additional DP accelerator, and the DP accelerator has an entry in the adjacency table of the DP accelerator for securely communicating with the at least one additional DP accelerator. In this embodiment, it is assumed that host determined that the at least one additional DP accelerator is, or soon will be, idle such that the at least one additional DP accelerator can perform one or more sub-tasks on behalf of the DP accelerator.

In operation 802, the DP accelerator transmits one or more sub-tasks to the at least one additional DP accelerator with instructions to perform the sub-task(s). The at least one additional DP accelerator performs the one or more sub-tasks.

In operation 803, the DP accelerator also performs one or more sub-tasks of the received processing task.

In operation 804, the DP accelerator receives one or more results from the at least one additional DP accelerator. The DP accelerator completes its one or more sub-tasks of the processing tasks, and returns, to the host, one or more results from the one or more sub-tasks perform by the DP accelerator and the one or more sub-tasks performed by the at least one additional DP accelerator. Method 800 ends.

The peer-to-peer communication between DPAs can be extended to broadcast a message from the host to a select number of DPAs (or subset of DPAs or designated DPAs) using a broadcast protocol through a communication chain between the DPAs or via a communication switch (such as a PCIe switch) coupled to the DPAs. Broadcast can be used where the host is required to communicate a message to a number of DPAs. A broadcast communication occurs when an application of the host schedules a job to be processed by a subset of DPAs (or designated DPAs) and the application is required to send the same information (e.g., input data or model) to the subset of DPAs. The broadcast protocol is required to be secure (i.e., only the subset of DPAs can read the broadcast message) yet robust (e.g., having a session-based encryption scheme).

Figure 9:
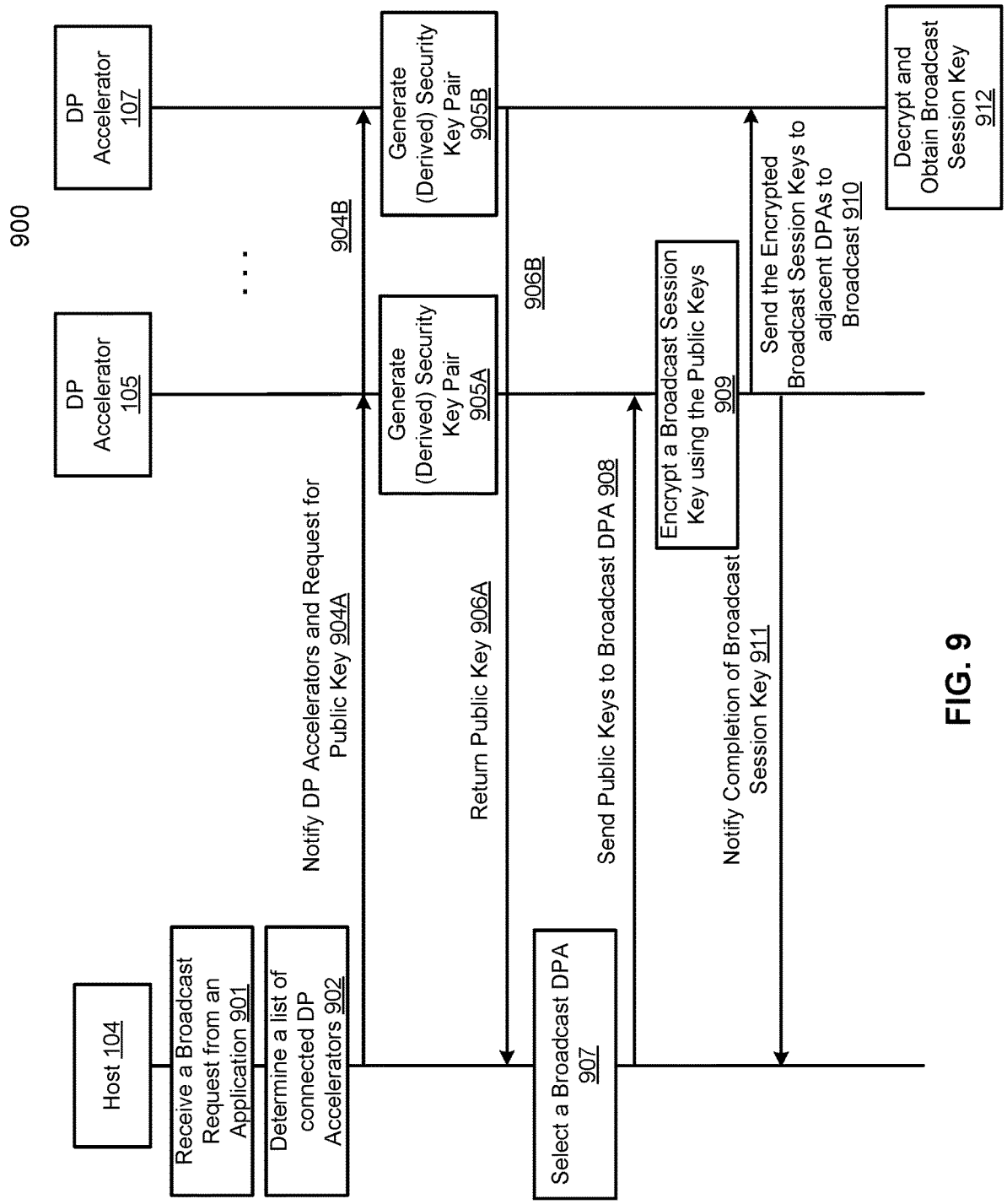
FIG. 9 is a flow chart illustrating a broadcast protocol of a host and one or more data processing accelerators according to an embodiment.

FIG. 9 is a flow chart illustrating a broadcast protocol of a host and one or more data processing accelerators according to an embodiment. A broadcast communication refers to a communication of data from a host or DPA to many listeners (e.g., many DPAs) (e.g., one-to-many relationship), instead of a one-to-one relationship. The receiving DPAs can include many DPAs, including DPAs in communication with one or more hosts or a subset of DPAs associated with one host in communication with a requesting application requesting the broadcast. Referring to FIG. 9, method 900 can be performed by host 104 and one or more DPAs 105-107 communicatively coupled to host 104, where the DPAs are coupled to each other in a chain configuration as illustrated in FIG. 4.

In one embodiment, at block 901, host 104 receives a broadcast request from an application of host 104. The broadcast request can be a request to broadcast an identical, or repeatable message to a subset of DPAs in communication with host 104. The broadcast request can identify the subset of DPAs by DPA identifiers. At block 902, optionally, host 104 determines a list of DPAs coupled to host 104 or requests an update to the list of coupled DPAs. In one embodiment, host 104 verifies the broadcast DPAs are within the list of DPAs. At block 904, host 104 sends requests to the subset of DPAs for a public key associated with the DPAs. The public key can be part of a security key pair derived by a root key of a security unit for each of the DPAs, or a public key associated with the root key. At block 905, the DPAs generate derived security key pairs, where the derived private keys of the pairs are kept safe by the DPAs, and the derived public keys of the pairs are sent to host 104, at block 906.

At block 907, host 104 selects a broadcast DPA. In one embodiment, the broadcast DPA can be selected based on an average of the shortest distances to each of the subset of DPAs from the broadcast DPA to minimize a broadcast latency. In another embodiment, the broadcast DPA can be selected based on a currently scheduled computational load, or available computation capacity of the DPAs compared with the rest of the DPAs. In another embodiment, the DPAs can be randomly selected based on a random number generator. For this example, the broadcast DPA selected is DPA 105 for the purpose of illustration. At block 908, host 104 sends the public keys to the broadcast DPA 105, and optionally, generates and sends a broadcast session key to the broadcast DPA 105, where the broadcast session key is a symmetric key used for encrypting and decrypting of the broadcast communication session. In another embodiment, the broadcast session key is generated locally by broadcast DPA 105 and the broadcast session key is sent by broadcast DPA 105 to host 104. In one embodiment, the broadcast session key can be a randomly generated session key.

At block 909, upon receiving the public keys (and optionally the broadcast session key), DPA 105 encrypts the broadcast session key with each of the public keys to generate a set of messages for propagation. In another embodiment, block 909 can be performed by host 104, e.g., host 104 encrypt the broadcast session key with each of the public keys to generate a set of messages and host 104 sends the set of messages to DPA 105 for propagation.

At block 910, broadcast DPA 105 broadcasts the encrypted broadcast session key to the DPAs through physical channels coupled to any of its ports (here, as illustrated in FIG. 4, DPA 106 is coupled at port 1 of DPA 105, and DPA 107 is coupled at port 2 of DPA 105). Broadcast DPA 105 sends the encrypted broadcast session key to DPA 106 at port 1 and DPA 107 at port 2. In one embodiment, the broadcast message includes a message header that specifies a propagation instruction for the DPAs receiving the broadcast message to propagate or repeat the broadcast to DPAs coupled to their respective ports, and an instruction to terminate a propagation when any DPA receives the broadcast message twice. Referring to FIG. 4, for example, upon receiving the broadcast at port 1 by DPA 106, DPA 106 sends or propagates a first message to a DPA coupled at port 2 of DPA 106, e.g., sends the broadcast message to DPA 107 via port 1 of DPA 107. Because DPA 107 received the message twice, (from DPA 105 and DPA 106), this first message propagation terminates at DPA 107. Similarly, upon receiving the broadcast at port 2 by DPA 107 (because DPA 105 sends the broadcast to DPA 107 at port 2), DPA 107 sends or propagates a second propagation message to a DPA coupled at port 1 of DPA 107, e.g., sends the broadcast message to DPA 106 via port 2 of DPA 106. Here, because DPA 106 received the message twice (from DPA 105 and DPA 107), this second message propagation terminates at DPA 106. At block 911, upon dispatch of the propagation messages, DPA 105 notifies host 104 that the broadcast session key is delivered to the DPAs. At block 912, each of the subset of DPAs receiving the encrypted broadcast session key decrypts and obtains the broadcast session key using a private key of the DPA.

Thereafter, data to be broadcasted by the requesting application can be encrypted by host 104 based on a broadcast session key and data can be sent from host 104 to broadcast DPA 105 for propagation, or broadcast DPA 105 encrypts the data based on the broadcast session key for propagation. Upon receiving the broadcast data, the subset of DPAs with the broadcast session key can decrypt and obtain the broadcast data.

In another embodiment, DPA 105 broadcasts the encrypted broadcast session key to a DPA coupled to only one of its ports, the broadcast includes a propagation instruction for the DPAs receiving the broadcast message to propagate the broadcast to DPAs coupled to their respective ports, and an instruction to terminate the propagation when the broadcast DPA 105 receives the original broadcast message. In this case, the broadcast message would traverse in a circular manner. For example, the broadcast can traverse clockwise, e.g., DPA 105->DPA 107->DPA 106->DPA 105, in which case, DPA 105 receives the original broadcast and terminates the propagation. The broadcast can traverse counter clockwise, e.g., DPA 105->DPA 106->DPA 107->DPA 105, in which case, DPA 105 receives the original broadcast and terminates the propagation. When each of the DPAs receive the broadcast, the subset of DPAs participating in the broadcast can decrypt and obtain the broadcast session key based on a private key associated with the DPA. Thereafter, broadcast data received by any of the subset of DPAs can decrypt the broadcast using the broadcast session key. In some embodiments, any communication (or broadcasts) between adjacent ADPs discussed above can be further encrypted using adjacent session keys based on the adjacency tables of FIG. 5.

Figure 10:
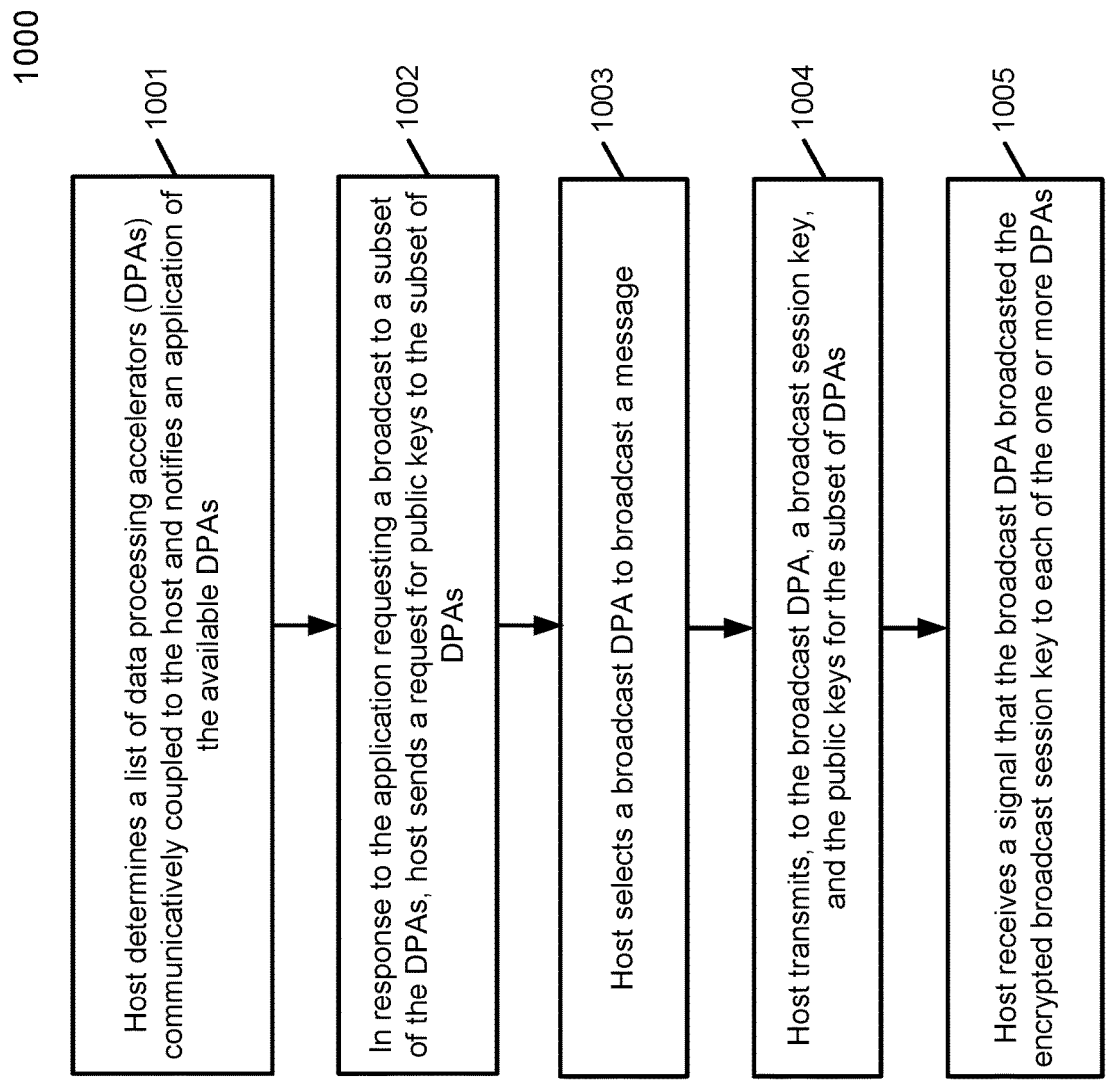
FIG. 10 is a flow diagrams illustrating an example method for a host to perform a broadcast according to an embodiment.

FIG. 10 is a flow diagrams illustrating an example method for a host to perform a broadcast according to an embodiment. Process 1000 may be performed by processing logic which may include software, hardware, or a combination thereof. For example, process 1000 may be performed by host system, such as host 104 of FIG. 4 or FIG. 9. Referring to FIG. 10, at block 1001, processing logic determines a list of data processing accelerators (DPAs) communicatively coupled to the host and notifies an application of the available DPAs. At block 1002, in response to an application requesting to broadcast to a subset of the DPAs, processing logic sends a request for public keys from the subset of the DPAs. At block 1003, processing logic determines one of the subset of DPAs as a broadcast DPA to facilitate the broadcast. Here, the selection can be made based on an average of nearest distances to the rest of the subset of DPAs or based on availability of computational capacity, or based on a random selection, etc. At block 1004, processing logic transmits to the broadcast DPA the broadcast session key, and each of the public keys for the subset of DPAs, where the broadcast DPA encrypts the broadcast session key using each of the public keys to propagation the message to its adjacent DPAs. In another embodiment, processing logic encrypts the broadcast session key using each of the public keys for the subset of DPAs to generate a set of encrypted broadcast session key messages, and transmit the set of messages to the broadcast DPA, where only a DPA with a corresponding private key can decrypt the message. At block 1005, processing logic receives a signal indicating that the broadcast DPA broadcasted the encrypted broadcast session key to each of the one or more DPAs, where only the subset of DPAs can decrypt the broadcast session key.

Figure 11:
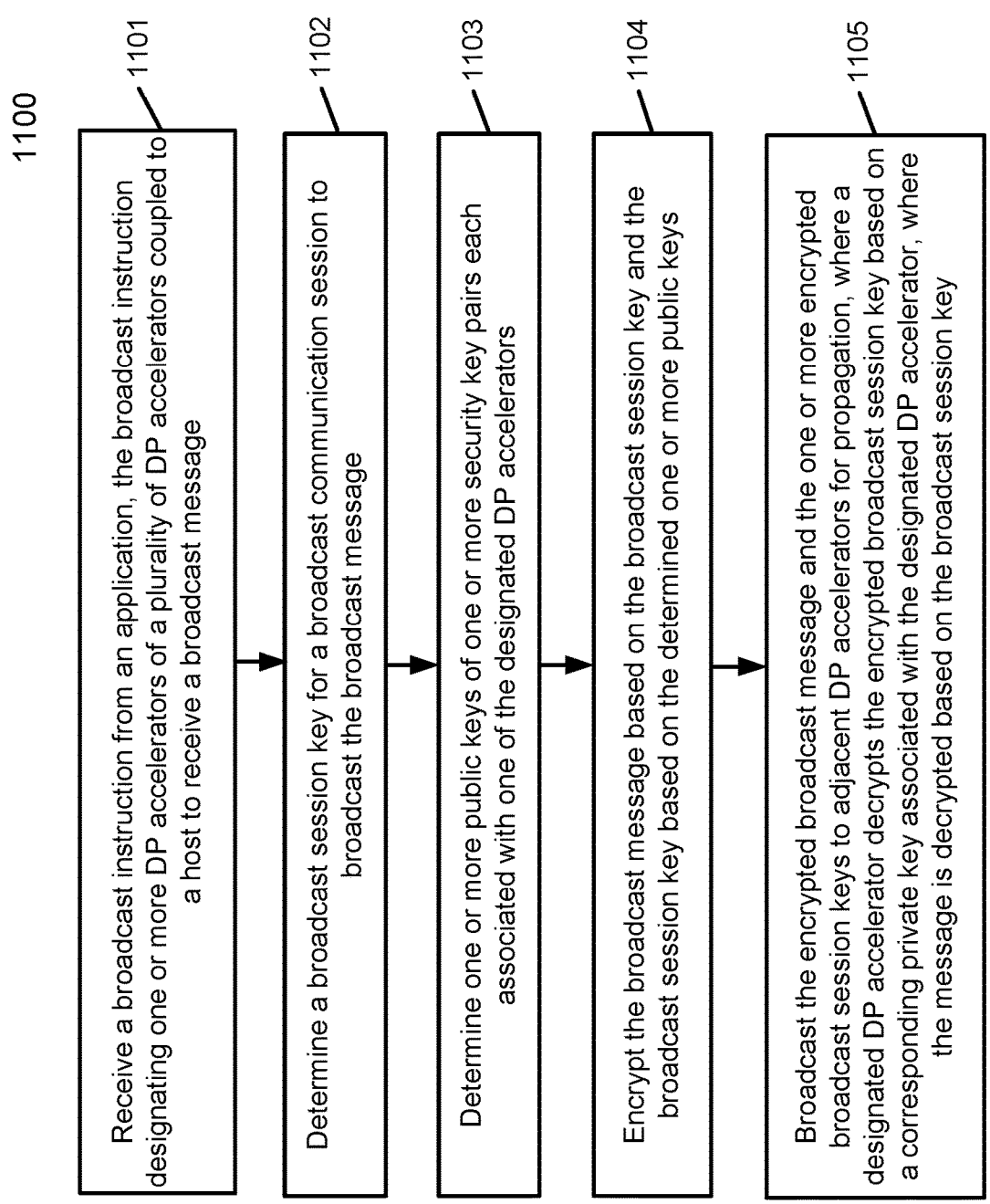
FIG. 11 is a flow diagrams illustrating an example method for a data processing accelerator to perform a broadcast according to an embodiment.

FIG. 11 is a flow diagrams illustrating an example method for a data processing accelerator to perform a broadcast according to an embodiment. Process 1100 may be performed by processing logic which may include software, hardware, or a combination thereof. For example, process 1100 may be performed by a DPA, such as DPA 105 of FIG. 4 or FIG. 9. Referring to FIG. 11, at block 1101, processing logic receives a broadcast instruction from an application, the broadcast instruction designating one or more DP accelerators of a plurality of DP accelerators coupled to a host to receive a broadcast message. At block 1102, processing logic determines a broadcast session key for a broadcast communication session to broadcast the broadcast message. At block 1103, processing logic determines one or more public keys of one or more security key pairs each associated with one of the designated DP accelerators. At block 1104, processing logic encrypts the broadcast message based on the broadcast session key and the broadcast session key based on the determined one or more public keys. At block 1105, processing logic broadcasts the encrypted broadcast message, and the one or more encrypted broadcast session keys to adjacent DP accelerators for propagation, where a designated DP accelerator decrypts the encrypted broadcast session key based on a corresponding private key associated with the designated DP accelerator, where the message is decrypted based on the broadcast session key.

In one embodiment, the DP accelerator receiving the broadcast instruction from the application is designated as a broadcast DP accelerator to broadcast a message. In one embodiment, the adjacent DP accelerators propagates the broadcast by receiving the broadcast and forwarding the broadcast to their adjacent DP accelerators.

In one embodiment, the broadcast propagation terminates if the designated DP accelerator receives the propagation broadcast. In one embodiment, the broadcasted message for propagation includes a message source, a message context, but no message destination.

In one embodiment, a non-designated DP accelerator of the plurality of DP accelerators receives the broadcast but does not have a corresponding key to decrypt the encrypted broadcast for generation of the broadcast session key and the non-designated DP accelerator has no access to the broadcast session key to decrypt the broadcast message for the communication session. In one embodiment, the broadcast message is communicated via a physical communication channel associated with a DP accelerator.

With respect to any of the above aspects, a host processor may be a central processing unit (CPU) and a DP accelerator may be a general-purpose processing unit (GPU) coupled to the CPU over a bus or interconnect. A DP accelerator may be implemented in a form of an application-specific integrated circuit (ASIC), a field programmable gate array (FPGA) device, or other forms of integrated circuits (ICs). Alternatively, the host processor may be a part of a primary data processing system while a DP accelerator may be one of many distributed systems as secondary systems that the primary system can offload its data processing tasks remotely over a network (e.g., cloud computing systems such as a software as a service or SaaS system, or a platform as a service or Paas system). A link between a host processor and a DP accelerator may be a peripheral component interconnect express (PCIe) link or a network connection such as Ethernet connection.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 12:
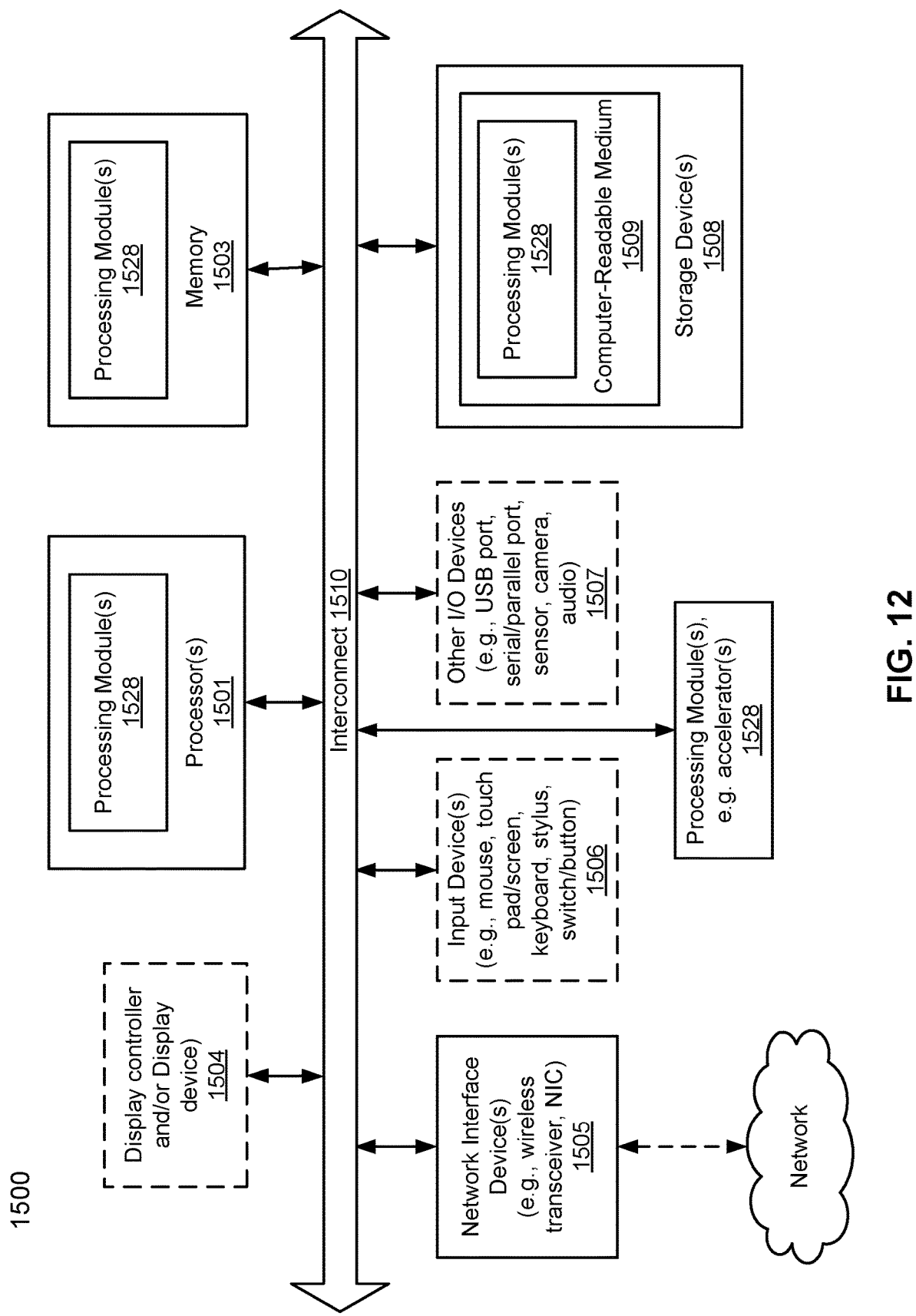
FIG. 12 is a block diagram illustrating a data processing system according to one embodiment.

FIG. 12 is a block diagram illustrating an example of a data processing system which may be used with one embodiment of the invention. For example, system 1500 may represent any of data processing systems described above performing any of the processes or methods described above, such as, for example, a client device or a server described above, such as, for example, host 104 or DPAs 105-107, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, host server 104 or DPAs 105-107 of FIG. 4. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method to broadcast a message to two or more data processing (DP) accelerators, the method comprising:
   receiving a broadcast request from a host that hosts an application that initiated a broadcast message to be broadcast to two or more DP accelerators of a plurality of DP accelerators coupled to the host, wherein the broadcast request includes two or more DP accelerator identifiers (IDs) identifying the two or more DP accelerators;
   receiving from the host a broadcast session key for a broadcast communication session to broadcast the broadcast message; and
   for each of the one or more DP accelerator IDs:
   identifying a public key of a security key pair corresponding to the DP accelerator ID,
   encrypting the broadcast message using the broadcast session key,
   encrypting the broadcast session key using the public key, and
   transmitting the encrypted broadcast message and the encrypted broadcast session key to the DP accelerator identified by the DP accelerator ID, wherein the DP accelerator is configured to decrypt the encrypted broadcast session key using a corresponding private key associated with the DP accelerator ID and to decrypt the encrypted broadcast message using the broadcast session key, wherein one or more adjacent DP accelerators of the two or more DP accelerators propagates the broadcast by receiving the broadcast and forwarding the broadcast to their adjacent DP accelerators and the broadcast message is communicated via peripheral component interconnect or peripheral component interconnect express channel.

2. The method of claim 1, wherein the DP accelerator of the two or more DP accelerators receiving the broadcast from the application is designated as a broadcast DP accelerator to broadcast the message.

3. The method of claim 1, wherein the broadcast terminates if a designated DP accelerator receives the broadcast.

4. The method of claim 1, wherein the broadcast message includes a message source, a message context, but no message destination.

5. The method of claim 1, wherein a non-designated DP accelerator of the plurality of DP accelerators receives the broadcast but does not have the corresponding key to decrypt the encrypted broadcast message for generation of the broadcast session key and the non-designated DP accelerator has no access to the broadcast session key to decrypt the broadcast message for a communication session.

6. The method of claim 1, wherein the broadcast message is communicated via a physical communication channel associated with a DP accelerator.

7. A non-transitory machine-readable medium having instructions stored therein, which when executed by a processor, cause the processor to perform one or more operations, the operations comprising:
   receiving a broadcast request from a host that hosts an application that initiated a broadcast message to be broadcast to two or more DP accelerators of a plurality of DP accelerators coupled to the host, wherein the broadcast request includes two or more DP accelerator identifiers (IDs) identifying the two or more DP accelerators;
   receiving from the host a broadcast session key for a broadcast communication session to broadcast the broadcast message; and
   for each of the one or more DP accelerator IDs:
   identifying a public key of a security key pair corresponding to the DP accelerator ID,
   encrypting the broadcast message using the broadcast session key,
   encrypting the broadcast session key using the public key, and
   transmitting the encrypted broadcast message and the encrypted broadcast session key to the DP accelerator identified by the DP accelerator ID, wherein the DP accelerator is configured to decrypt the encrypted broadcast session key using a corresponding private key associated with the DP accelerator ID and to decrypt the encrypted broadcast message using the broadcast session key, wherein one or more adjacent DP accelerators of the two or more DP accelerators propagates the broadcast by receiving the broadcast and forwarding the broadcast to their adjacent DP accelerators and the broadcast message is communicated via peripheral component interconnect or peripheral component interconnect express channel.

8. The non-transitory machine-readable medium of claim 7, wherein the DP accelerator of the two or more DP accelerators receiving the broadcast from the application is designated as a broadcast DP accelerator to broadcast the message.

9. The non-transitory machine-readable medium of claim 7, wherein the broadcast terminates if a designated DP accelerator receives the broadcast.

10. The non-transitory machine-readable medium of claim 7, wherein the broadcast message includes a message source, a message context, but no message destination.

11. The non-transitory machine-readable medium of claim 7, wherein a non-designated DP accelerator of the plurality of DP accelerators receives the broadcast but does not have the corresponding key to decrypt the encrypted broadcast message for generation of the broadcast session key and the non-designated DP accelerator has no access to the broadcast session key to decrypt the broadcast message for a communication session.

12. The non-transitory machine-readable medium of claim 7, wherein the broadcast message is communicated via a physical communication channel associated with a DP accelerator.

13. A data processing system, comprising:
- a processor; and
- a memory coupled to the processor to store instructions, which when executed by the processor, cause the processor to perform operations, the operations including receiving a broadcast request from a host that hosts an application that initiated a broadcast message to be broadcast to two or more DP accelerators of a plurality of DP accelerators coupled to the host, wherein the broadcast request includes two or more DP accelerator identifiers (IDs) identifying the two or more DP accelerators;
- receiving from the host a broadcast session key for a broadcast communication session to broadcast the broadcast message; and
- for each of the one or more DP accelerator IDs:
- identifying a public key of a security key pair corresponding to the DP accelerator ID,
- encrypting the broadcast message using the broadcast session key,
- encrypting the broadcast session key using the public key, and
- transmitting the encrypted broadcast message and the encrypted broadcast session key to the DP accelerator identified by the DP accelerator ID, wherein the DP accelerator is configured to decrypt the encrypted broadcast session key using a corresponding private key associated with the DP accelerator ID and to decrypt the encrypted broadcast message using the broadcast session key, wherein one or more adjacent DP accelerators of the two or more DP accelerators propagates the broadcast by receiving the broadcast and forwarding the broadcast to their adjacent DP accelerators and the broadcast message is communicated via peripheral component interconnect or peripheral component interconnect express channel.

14. The system of claim 13, wherein the DP accelerator of the two or more DP accelerators receiving the broadcast from the application is designated as a broadcast DP accelerator to broadcast the message.

15. The system of claim 13, wherein the broadcast terminates if a designated DP accelerator receives the broadcast.

16. The system of claim 13, wherein the broadcast message includes a message source, a message context, but no message destination.

17. The system of claim 13, wherein a non-designated DP accelerator of the plurality of DP accelerators receives the broadcast but does not have the corresponding key to decrypt the encrypted broadcast message for generation of the broadcast session key and the non-designated DP accelerator has no access to the broadcast session key to decrypt the broadcast message for a communication session.

18. The system of claim 13, wherein the broadcast message is communicated via a physical communication channel associated with a DP accelerator.

* * * * *